PILOT OPERATED BALANCED RELIEF VALVE WITH ACCUMULATOR

Original Filed June 30, 1961

JAMES K. DOUGLAS
INVENTOR

T. Lloyd La Fave
ATTORNEY

United States Patent Office

Re. 25,524
Reissued Feb. 25, 1964

25,524

PILOT OPERATED BALANCED RELIEF VALVE WITH ACCUMULATOR

James K. Douglas, Shorewood, Wis., assignor to The Oilgear Company, Milwaukee, Wis.

Original No. 3,083,727, dated Apr. 2, 1963, Ser. No. 121,255, June 30, 1961. Application for reissue Mar. 21, 1963, Ser. No. 267,897
4 Claims. (Cl. 137—489)

Matter enclosed in heavy brackets [ ] appears in the original patent but forms no part of this reissue specification; matter printed in italics indicates the additions made by reissue.

The invention relates to a hydraulic pressure relief valve for a substantially non-compressible fluid and more particularly, to a pilot operated relief valve.

It frequently occurs, in hydraulic systems, that supply and load devices produce sudden changes in system pressure resulting in peaking pressures in the system. Relief valves heretofore employed have not satisfactorily relieved such peaking pressures, whether they occurred above or below the pressure setting of the pilot valve, resulting in overshooting the desired system pressure. The compressibility of the substantially noncompressible fluid such as oil has contributed to undesirable valve chatter and poor valve response.

The valve of the present invention utilizes the compressibility of the fluid with a structure arrangement that provides for greater opening of the valve without valve chatter due to compressibility of the fluid and increases the speed of response of the valve to relieve peaking and excessive pressures.

The valve embodying the invention has a structural arrangement in which the volume of fluid in a hold down chamber is a minimum to reduce the spring effect of such fluid to avoid oscillations which result in undersirable noise and destruction of equipment. The structure of the present valve also causes it to open more than an amount merely proportional to the compression of the fluid in the hold down chamber to thereby reduce peaking pressures and eliminate shocks to the hydraulic system that would have been produced by such peaking pressures.

The present invention comprises a relief valve having a hold-down chamber from which fluid is displaced at a limited rate to provide additional opening of the valve at a diminishing rate for reducing peaking pressures and eliminating or substantially reducing shock to the hydraulic system.

The valve of the present invention includes a chamber that will receive fluid displaced at a limited rate from the control or hold-down chamber of the valve and includes common subject matter disclosed in applicant's copending application, Serial Number 801,045, filed March 23, 1959, and now abandoned, of which this application is a continuation in part.

It is an object of this invention to reduce peaking pressures encountered by the relief valve.

Another object of the invention is to provide a relief valve that reduces peaking pressures whether occurring at values above or below the pressure setting of the pilot valve.

Another object of the invention is to provide a pilot operated relief valve operable without valve chatter and with improved capacity to spit inlet fluid to exhaust to relieve the system of peaking pressures.

Another object of the invention is to provide a pilot operated pressure relief valve that reduces a sharp rate of rise of system pressure to prevent overshooting a desired pressure.

Another object of the invention is to provide a pilot operated pressure relief valve that directly responds to an increase in system pressure to prevent the system pressure overshooting the pressure setting of the pilot valve.

Another object of the invention is to provide a pilot operated pressure relief valve whose full open position or lift is limited to a position for rated flow through the valve and nevertheless provides such valve with improved spitting capacity to reduce peaking pressures.

Other objects and advantages will be apparent from the following description and accompanying drawings in which.

Figure 1:
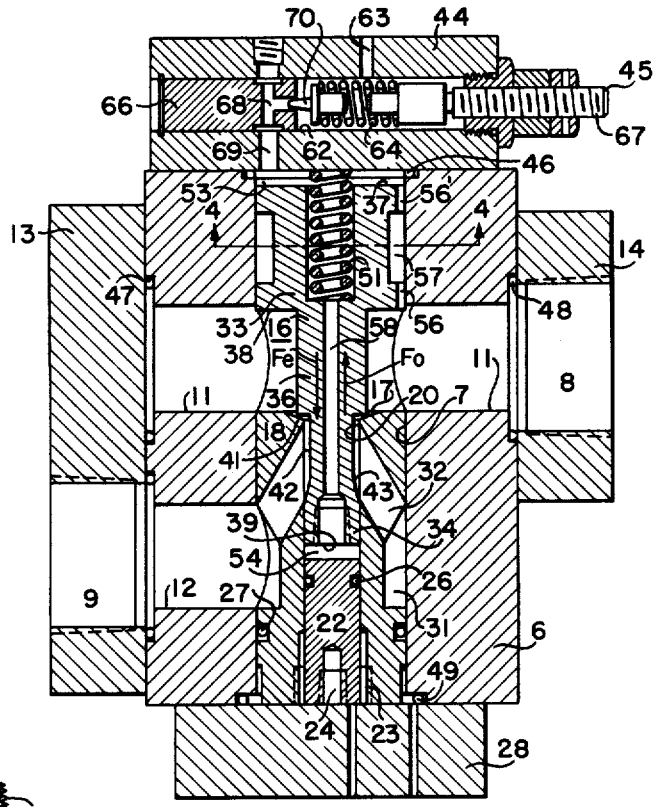
FIG. 1 is a cross-sectional view in elevation of a pilot operated relief valve embodying the invention.

The valve shown in the drawing embodies the present invention and comprises a valve body 6 having a longitudinally extending chamber formed by a bore 7. Inlet and outlet ports 8 and 9 in the valve body are formed by spaced bores 11 and 12 disposed transversely of the valve chamber 7 and connected thereto. Inlet bore 11 extends through the valve body to provide symmetrical portions on opposite sides of the valve chamber subject to the high pressure of fluid at the inlet port.

Mounting flanges 13, 14 are secured on both sides of the valve body and serve to close one end of the inlet bore and serve to adapt the other end of the inlet bore and the outlet bore as the inlet and outlet ports 8, 9 connectable, respectively to relatively high and low pressure sections of a hydraulic circuit.

Fluid flow communication between the inlet and outlet ports is normally interrupted by a movable poppet type of valve or plunger 16 against a valve seat 17 that is provided in the valve chamber between the inlet and outlet bores.

The valve seat is provided by a bushing 18 press fitted in the outlet portion of the valve bore 7 and having an upper end adjacent the inlet bore that is finished to provide a cone shaped surface inclined inward and downward at an angle of approximately 70° with the axis of the valve bore and defines the seat 17.

The bushing 18 extends beyond the outlet bore 12 and its lower end is suitably closed by a plug 22 press fitted therein. The end 21 of the bushing and the plug 22 are shown provided with threaded counterbores 23, 24 which are for receiving suitable pulling tools for removal of the plug or bushing.

A suitable O-ring seal 26 is disposed between the plug and the wall of the bushing, and a similar O-ring seal 27 is disposed between the bushing and the wall of the valve bore 7 downstream of the outlet bore in the valve body. A flange 28 is mounted on the lower end of the valve in sealing engagement therewith and in abutment with the plug and bushing to axially secure them in the valve bore.

To provide flow passage through the bushing, the bushing has an annular chamber 31 formed in its outer wall communicating with the outlet bore 12, and a plurality of inclined discharge holes 32 through the wall of the bushing and opening into annular chamber 31. The discharge holes are inclined downward from inside to outside of the bushing at an angle preferably of about 30° with the axis of the valve bore 7.

The valve or plunger 16 is an integral unit comprising a relatively large piston 33 formed at its upper end, a relatively small piston 34 formed at its lower end, and a cylindrical portion 36 formed intermediate the large and small pistons and having a diameter slightly larger than that of the small piston. The large piston 33 is fitted in the upper end of the valve bore 7, the small piston 34 is fitted in the lower end of the bushing 18, and the intermediate cylindrical portion 36 is disposed in the valve chamber adjacent the inlet bore 11 and above the bushing. The top surface 37 of the large piston provides a hold down area, the opposite surface 38 a lift area, and the bottom surface 39 of the small piston provides a lift area substantially equal to the differential area of the large piston. The plunger has a reduced cross sectional area between the cylindrical portion 36 and the small piston 34 such that the end surface of the cylindrical portion forms a square edged shoulder 41 that abuts the valve seat 17 and cooperates therewith to provide a variable orifice which directs flow therethrough at an angle of approximately 70° to the axis of the valve.

The cut away or reduced portion of the plunger adjacent the small piston defines a discharge chamber 42 within the plunger that receives flow across the orifice and directs the flow radially outward into discharge holes 32 in the bushing. The adjacent face 43 of the small piston has a surface inclined outward and downward and oppositely inclined relative to the direction of flow at the orifice. This surface 43 is inclined at a substantially smaller angle than the direction of inlet flow and is preferably an angle of 30° to the valve axis. Discharge chamber 42 is thus constructed and arranged not only to minimize net axial flow forces tending to move the valve, but also to prevent equal and opposed effective surface areas to pressure existing within the chamber 42 due to back pressure that may build up therein and due to transient pressures that may appear therein.

The valve discharge chamber 42 is also subject to a suction effect created by an accelerated column of discharged fluid moving away from the valve. Such suction effect does not create valve chatter in this valve because the discharge chamber presents equal and opposed effective surfaces 41, 43 subject to the negative pressure of such suction.

The valve bore 7 is closed at the top of the valve by a head or end flange 44 suitably mounted thereon which contains an adjustable pilot valve 45 as hereinafter described. The head flange 44 as well as the side flanges 13, 14 and the bottom flanges 28 are each sealed, respectively, by O-rings 46, 47, 48 and 49 confined between the flanges and the valve body. A compression spring 51 disposed in a bore 52 in the end of the large piston 33 acts against the head flange 44 to urge the movable valve 16 downward and normally holds the shoulder 41 of cylindrical portion against the valve seat. In the closed position shown the large piston is spaced from the head flange only an amount to permit movement of the plunger away from the seat for full opening of the orifice for rated flow therethrough, and in the plunger position shown, the small piston is spaced from the closed end of the bushing which serves as a pressure balance chamber 54 for the plunger. Opposite ends of the valve chamber thus provide pressure chambers 53, 54 at opposite ends of the large and small pistons, respectively. The chamber 53 is referred to as a hold down chamber in which pressure fluid acts on the end area or hold down area 37 of the large piston 33 which is the control piston of the valve.

Flow limiting passage means 56, 56′ interconnects the inlet port 8 with the hold down chamber 53, and such flow limiting passage means is shown in FIG. 1 as formed by longitudinally slotting the cylindrical surface of the large piston to establish self-cleaning restriction passages for a limited rate of flow between the end surfaces of the large piston. The slotting is preferably provided by 60 degree angle V-shaped grooves having a depth on the order of .035 inch, and preferably there are three such slots circumferentially spaced about the piston 33. A pressure accumulator chamber is provided by an annular chamber 57 formed in the cylindrical surface of the large piston intermediate its ends and between the restriction slots 56, 56′. Thus slots 56, 56′ form a flow limiting means connecting the inlet port to the hold down chamber, and slots 56′ form a flow limiting means connecting the hold down chamber 53 to the accumulator chamber 57. Slots 56 provide a flow limiting means connecting the inlet port to the accumulator chamber. In the valve of FIG. 1 the slots 56 and 56′ are equal in number. The accumulator chamber 57 may be made to any predetermined volume sufficient to improve the spitting capacity and to decelerate the final opening movement of the valve. In this respect the clearance of the control piston from the valve head is made as small as possible, limited by the necessary opening of the valve at rated flow, and therefore, the volume of the accumulator to the hold-down area of the control piston is easily obtained to give additional lift without valve chatter.

Figure 2:
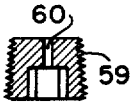
FIG. 2 is a cross-sectional view through a plug provided with an orifice that may be inserted in the passage through the balance piston of the valve of FIG. 1.
Figure 3:
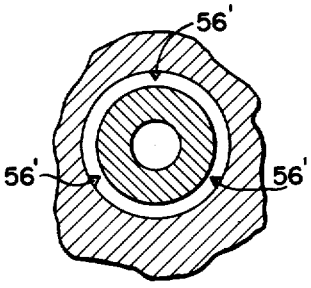
FIG. 3 is a sectional view taken along the line 4—4 of FIG. 1 to show the number of choke passages through the control piston.

A hole 58 drilled longitudinally and centrally through the plunger establishes communication between the opposite ends of the plunger and between the pressure chambers 53, 54 at the opposite ends of the valve chamber. A restriction plug 59, FIG. 2, may also be disposed in the end of the small piston and this plug has a small hole 60 that provides a restriction orifice between the central hole and the end of the small piston so that fluid flows therethrough to and from the end pressure chamber 54 at a predetermined limited rate to damp the movement of the valve plunger. The restriction slots 56, 56′ and central passage in the plunger thus establish a limited flow rate communication between the inlet port and the pressure chambers in opposite ends of the valve chamber and at opposite ends of the plunger.

The piston operated relief valve or plunger is suitably controlled by a conical pilot valve 61 fitted in a bore 62 in the end head flange 44. Bore 62 is connected to exhaust or suitably to the discharge or outlet port of the main valve as indicated either by a passage 63 to a reservoir or by a drain passage (not shown) through the end head connected to a drain passage in the valve body that opens to the outlet bore. Pilot valve 61 is urged by a spring 64 against an annular valve seat 66. As is well known, a spring tension adjustment screw 67 is mounted in the end head and bears against the spring 64.

Inlet pressure to the pilot valve is admitted from pressure chamber 53 through transverse passages 68, 69 in end head and valve seat that connects with an axial bore 70 in the valve seat 66. Such pressure acts on the seat area of the pilot valve 61 in opposition to the force of the spring 64 which is adjusted so that the pilot valve will open at a predetermined value of pressure acting thereon and destroy the static hydraulic balance of the plunger 16.

In operation inlet port pressure normally prevails in end pressure chambers 53, 54 and when the inlet pressure reaches the predetermined value the pilot valve opens and reduces the pressure in end chamber 53. The restricted flow from the opposite end chamber when restriction plug 59 is used limits the rate of flow therefrom so that decrease of pressure on the small piston is delayed and is effective to aid in opening of the valve. The restricted passage through slot 56, 56' to the inlet port also delays build up of pressure in chamber 53 so that inlet port pressure acting on lift area 38 of the large piston is effective to open the valve, because the valve described is normally hydrostatically balanced.

When the valve 16 opens, flow across the orifice into the discharge chamber 42 of the valve and into the outlet in the valve body produces dynamic reaction forces including flow forces that tend to close the valve, transient forces that tend to make the valve unstable. The flow forces are due to inlet flow across the orifice and outlet flow from the valve discharge chamber to the outlet port, which forces are here designated Fe and Fo, respectively; the inlet force Fe is positive in that it tends to close the valve, and the outlet force Fo is negative in that it tends to open the valve.

The cooperating valve seat and plunger, upon opening of the valve 16, directs flow across the orifice at an angle of approximately 70° with the axis of the valve and produce an axial component, Fe, of the inlet flow force that tends to close the valve. For such fixed configuration the axial force Fe varies with flow rate Q and with the square root of the pressure P. The chamber 42 in the valve adjacent the orifice provides a discharge surface 43 that is oppositely inclined from the inlet flow and directs the discharge flow into the outlet at a substantially smaller angle to the valve axis than that of the inlet flow. For the chosen outlet area of the valve and its surface configuration, the axial component Fo of the outlet force tends to open the valve and varies with the square of the rate of flow Q. In the operating range of this valve the axial components of flow forces are such that axial force Fe tending to close the valve is always greater than axial force Fo tending to open the valve, and the difference is maintained at relatively small values for the relatively high operating pressures and relatively large rates of flow through the valve. At 3000 p.s.i., for example, and a flow rate of 10,000 c.i.p.m., the net axial component of the flow forces is only of the order of 28 pounds positive, tending to close the valve and represents substantially all of the hydrodynamic forces tending to move the valve.

The transient force on the valve varies with the axial length of the internal surface portion 20 of the bushing between the valve seat and the outlet holes in the bushing and varies with the rate of change in the flow rate. Such length is therefore made as short as possible so that the required damping is a minimum. Because such required damping is a minimum, the flow limiting means to the hold down chamber 53 from the inlet port 8 may be made larger and less limiting than otherwise and thereby permit a fast response of the pilot valve to system pressure so that the relief valve will open fully to more efficiently limit system pressure to a predetermined value.

With respect to the function of the accumulator chamber 57 between a pair of chokes 56, 56' it must be noted that valve fluid such as oil is compressible on the order of ½ of 1% per 1000 p.s.i. While oil in the hold down chamber is compressible, such compression takes place substantially instantly with a pressure change at the valve inlet with lift of the plunger. The additional volume represented by the compressibility of the fluid in the accumulator chamber and the upper choke serves, however, to bleed fluid from the hold down chamber as the plunger rises and thereby cushions the opening stroke of the plunger.

The accumulator chamber receives fluid from the hold down chamber as well as from the valve inlet in raising the pressure in the accumulator as a result of valve opening below the pressure setting of the pilot valve. The additional lift of the plunger is a result of fluid displaced from the hold down chamber, and the velocity of the plunger during the added lift of the plunger is determined by the rate of flow of displaced fluid to the accumulator chamber; and such rate is determined by the resistance to flow of the upper choke provided by the restriction slots 56'. Through the range of additional lift of the plunger its velocity diminishes rapidly toward maximum lift position thereby eliminating hydraulic shock and oscillation of the plunger. After reaching maximum lift position, the plunger returns to closed position at a rate determined by the force of the hold down spring 51 and the rate of flow of fluid from the inlet in series through the lower and upper chokes to the hold down chamber.

When the valve opens below the pressure setting of the pilot valve, fluid is discharged from inlet to exhaust which is referred to herein as spitting. Since such spitting is a function of the opening or lift L of the plunger and the inlet pressure, the relative spitting of a valve with a choke having a resistance R, but without an accumulator, may be compared with that of a valve with an accumulator connected to inlet by a choke having a resistance $R_1$ and connected to the hold down chamber by a choke having a resistance $R_2$, in which $R_1$ is equal to $R_2$ and the series resistance of $R_1$ and $R_2$ is equal to R.

Consider, for example, a cylinder containing oil confined by a piston. Applying a hydraulic pressure to the piston will compress the confined oil. The change in the volume of the oil under compression is proportional to the increase P in the applied pressure and to the coefficient $k_1$ of compressibility of the oil. Letting $y$ be the initial length of the cylinder of oil and A be the end area thereof, then yA represents the initial volume of oil. Letting L be the distance that the piston travels in compressing the oil, then LA is the change in volume and is equal to the product of $k_1yAP$. The distance L that the piston moves, or its lift, is therefore $k_1yP$, and substituting k for the constant $k_1y$ the expression is $$L=kP \qquad (1)$$

In the case of a balanced piston with an interconnecting flow restricting passage or choke between the chambers on opposite sides of the piston, the initial displacement L of the piston will also be equal to kP. Flow through the choke, moreover, permits the piston to be returned to its initial position upon the application of a small bias force to the piston. This return force is conventionally provided by a bias spring acting on the piston and the spring force may be represented by an equivalent pressure Ps. Because of the spring the maximum lift of a balanced piston, without an accumulator should be expressed as $$L(\max.)=k(P-Ps) \qquad (2)$$

The rate of return of the piston is dependent on the flow through the choke and is therefore dependent on the pressure across the choke and the flow limitation of the choke. The pressure across the choke (P—Ph) is the equivalent spring pressure Ps and R is the resistance to flow of the choke. The volume change due to the pressure increase is LA which is equal to a flow through the choke in returning the piston to its initial position. Therefore the volume displacement equals the flow through the choke for a time t:

$$LA=\frac{1}{R}\int Psdt$$

Therefore $$L=\frac{1}{AR}\int Psdt \qquad (3)$$

defines the return position of the piston at any time t after initial displacement which is taken as occurring instantly.

Now in the case of a balanced piston or a valve with an accumulator, as described herein, a sudden increase in inlet pressure will also lift the piston an initial distance represented by k(P—Ps) but will also displace fluid from the control chamber into the accumulator and thereby permit further lift of the piston. This additional lift of the piston is not instantaneous but occurs at a rate determined by the rate of flow of fluid through the choke between the hold down chamber and the accumulator and the amount of fluid that can be so displaced from the hold down chamber. Letting Pa be the pressure rise in the accumulator then the pressure across the upper choke $R_1$ is the difference of the pressures or changes in pressures in the hold down chamber and in the accumulator and this differential pressure, (Ph−Pa), produces a flow to the accumulator until the pressure rise in the accumulator equals the pressure rise Ph in the hold down chamber.

The sudden rise in inlet pressure immediately lifts the piston an initial distance, k(P−Ps), so that the hold down forces balance the lift forces. At this time, the rise Pa in pressure in the accumulator is zero, and the rise Ph in pressure in the hold down chamber therefore provides a flow to the accumulator until the rise Pa in accumulator pressure becomes equal to the rise Ph in hold down pressure. The additional lift permitted by such displacement is therefore a function of the rise in pressure in the accumulator and the maximum of such additional lift is taken when Pa is equal to Ph for continued rise in Pa reverses the flow between the accumulator and hold down chamber. Pa continues to rise to the mean value of the rise in pressures in the inlet and hold down chambers, where it stabilizes until the valve is closed and then Pa rises to the inlet pressure.

For substantial and sudden increases in pressure relative to the equivalent pressure of the spring, substantially one half of the fluid added to the accumulator, to raise its pressure to that of the hold-down chamber, is displaced from the hold down chamber, and the volume of fluid displaced from the hold down chamber therefore is $$k_1(P-Ps)\frac{V}{2}$$

Such displacement of fluid is converted to piston travel by dividing by piston area, and substituting k for $k_1y$ the expression for additional lift then is $$L(\text{extra})=k(P-Ps)\frac{V}{2Ay} \qquad (4)$$

The maximum lift of the piston with an accumulator may therefore be expressed as the sum of the immediate lift and of the slower additional lift, thus $$L(\text{max.})=k(P-Ps)\left(1+\frac{V}{2Ay}\right) \qquad (5)$$

The maximum lifts, with and without an accumulator, are expressed by Equations 5 and 2, respectively, and their difference is the added lift of Expression 4.

Where the equivalent pressure is very small relative to the rise P in inlet pressure, the factor (kPs) becomes negligible so that maximum lift without an accumulator is $$L(\text{max.})=kP \qquad (6)$$

and with an accumulator is $$L(\text{max.})=kP\left(1+\frac{V}{2Ay}\right) \qquad (7)$$

For example, a relief valve as shown in FIG. 1, having a one inch diameter valve seat will have a flow through the valve of 700 c.i.p.m. when the valve is open .0012 inch and the inlet pressure is 1000 p.s.i. Given a mean length y for the hold down chamber equal to .250 inch, the lift kP for a pressure rise of 1000 p.s.i. will be .0012 inch. Given a ratio V/A equal to 1 the total lift will be .0037 inch and the flow at 1000 p.s.i. inlet will be increased from 700 c.i.p.m. to a maximum of 2160 c.i.p.m.

The difference between the lifts at time (t) when the lift is a maximum with an accumulator may be said to represent the mean effective spitting improvement with an accumulator as against operation without an accumulator. This shows that even a relatively small accumulator chamber will materially improve the spitting capacity of the valve.

Figure 5:
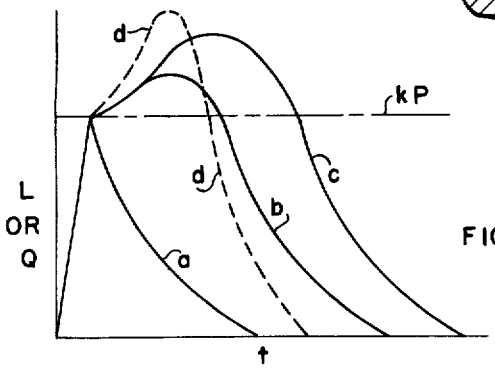
FIG. 5 shows a number of characteristic curves of the lift of the plunger and flow through the valve with respect to time for a pressure rise at the valve inlet below the setting of the pilot valve.

Graphically, these relationships are illustrated by the lift-time or flow-time characteristics shown in FIG. 5, wherein curve a is for a valve with a choke R and without an accumulator. Curve a shows that the plunger rises suddenly with the inlet pressure to a distance kP and then returns relatively slowly therefrom in accordance with the rate of flow through the choke R. Curves b and c are the characteristics for corresponding valves provided with small and larger accumulators, respectively, and having equal lower and upper chokes $R_1$ and $R_2$ whose effective series resistance is equal to a value R.

Curves b and c show that the plunger rises suddenly to a distance kP and then rises further at a diminishing rate over a relatively sustained time interval before beginning return to closed position. The relative spitting capacity of the valves represented by curves a, b and c are the areas under their respective curves, and their difference is the area between their respective curves. Curve b represents the flow characteristic or spitting of a valve whose ratio of accumulator chamber volume V to hold down area A is on the order of one-third; the improved spitting is, nevertheless, very significant, and it is evident also that the plunger movement is gradually slowed down near the maximum lift position. In terms of mean effective values, the corresponding flow rates or spitting may be taken at the time (t) when curve b is at a maximum and curve a has substantially decreased.

In view of the spitting capacity of the valve such as illustrated by curve c, FIG. 5, the response of the valve and its effect on rising pressure may readily be examined. Pressure may rise suddenly at the relief valve as a result of an increased fluid flow to the relief valve which may be caused such as by increasing the load on a hydraulic motor in a transmission system protected by the relief valve, and also may be caused by changing the displacement of a supply pump or of a load motor so as to increase the speed of the motor.

A relatively large increase in the load on a moving hydraulic motor, if suddenly applied, would not only permit system pressure to rise but would also create a rising wave of high pressure fluid which could peak at high values causing undesirable shock to the system before the pilot valve would operate to cause the relief valve to "blow." However, the relief valve of FIG. 1 would open as the rising wave first reached the relief valve and would continue to open to spit an increasing amount of fluid to exhaust to thereby so reduce the rate of rise of the pressure so that the pilot valve could take over control without the system pressure rising above the setting of the pilot valve.

Similarly, the relief valve of FIG. 1 would eliminate such peaking pressures as tend to occur even at values below the setting of the pilot valve. The spitting is so improved that it effectively limits the rate of rise of the pressure appearing at the inlet so that the system change in pressure to a new sustained higher value occurs without peaking. The load hydraulic motor may thus move without jerky changes in its velocity, and where a speed change is called for the resulting acceleration will be smooth.

Figure 4:
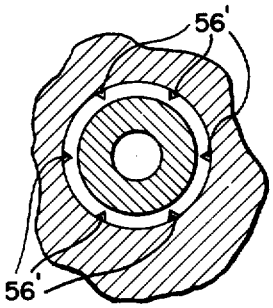
FIG. 4 is a similar view as that of FIG. 3 to show a modification of the number of choke passages in the upper portion of the control piston of a similar valve.

FIG. 4 represents a modification of the plunger 16 of the valve of FIG. 1 in that the upper portion of the control piston 33 is provided with more restriction slots 56′ than the lower portion which remains unchanged. Specifically, the lower portion of the control piston is provided with three restriction slots 56 and, in this modification, the upper portion is provided with six restriction slots 56′, whereby the flow resistance from the inlet to the accumulator is a larger value of resistance than the flow resistance between the accumulator and the hold down chamber. The resulting series resistance provided by the upper and lower chokes is less than the value R, heretofore referred to, and is the effective series resistance of the lower choke $R_1$ and the upper choke $R_2$.

In this modification of the valve the rate of flow from the hold down chamber to the accumulator is greater than from the inlet to the accumulator and results in utilizing more of the compressibility volume of the accumulator thereby further increasing the lift of the plunger for a given size of accumulator.

The modification of the valve by reducing the effective resistance of the upper choke is graphically illustrated by curve d, FIG. 5, which is to be compared with curve c for a valve with the same size of accumulator. Curve d shows that with the upper choke being less restrictive than the lower choke, that the plunger moves higher at a faster rate and also returns to closed position more rapidly than for the valve represented by curve c. The resistance of the upper choke must, however, be sufficient to decelerate the opening movement of the plunger to avoid hydraulic shock and "bounce" of the plunger; and the series resistance of the upper and lower choke must have a value limited by a permissible speed of closing of the valve.

Other changes or modifications may readily be made within the spirit of the invention disclosed and within the scope of the appended claims.

I claim:

1. A pressure relief valve for a substantially non-compressible fluid, said valve comprising a valve body having a valve chamber, inlet and outlet ports in said valve chamber, a valve seat provided in said valve chamber between said ports, a valve cooperating with said seat and having a large control piston closely fitted in one end of the valve chamber in the valve body and cooperates therewith to define a control chamber in said one end, said valve also having a small piston closely fitted in an opposite end of the valve chamber, said large piston having a lift area always subject to pressure at the inlet port and having an opposite area providing a hold down area subject to pressure in the control chamber, said small piston having an end area in the opposite end of the valve chamber providing a lift area substantially equal to the difference of the hold down area and the lift area of the large piston, passage means between the control chamber and the opposite end of the valve chamber so that the lift and hold down areas of the valve provide substantially hydrostatic balance of the valve when the pressure in the control chamber is equal to the pressure at the inlet port, spring means acting on said valve to urge said valve against said seat, a pilot valve mounted on said valve body and operable in response to the pressure in said control chamber exceeding a predetermined value to cause said valve to open and limit the pressure at the inlet port to said predetermined value, said control chamber having a minimum axial length to limit the lift of the control piston to a distance sufficient for rated flow through the valve when the pilot valve is open so as to normally have a minimum of fluid in said control chamber to minimize its spring effect on said control piston to thereby minimize valve chatter in the normal operation of said valve although thereby tending to make said valve substantially rigid and less responsive to peaking and fast rising inlet pressures, an accumulator constructed and arranged between the ends of the control piston so that fluid under pressure therein produces balanced forces on said control piston, a first flow restricting means comprising axially extending narrow slots in the periphery of the control piston and connecting said accumulator with said inlet port, a second flow restricting means [comprising axially extending narrow slots in the periphery of the control piston and] connecting said accumulator with said control chamber; whereby said pressure relief valve is free of valve chatter and is also effective to relieve peaking pressures and fast rising inlet pressures which do not open the pilot valve, wherein each of the fast rising inlet pressures immediately lifts the control piston a small amount and continues to lift the control a further small amount at a decelerating rate for effecting sustained spitting of pressure fluid during such fast rise of inlet pressure.

2. A pressure relief valve as defined in claim 1 in which the resistance to flow of the second flow limiting means is less than the resistance to flow of the first flow limiting means.

3. A hydrostatically balanced pressure relief valve for a substantially non-compressible fluid, said valve comprising a valve body having a valve chamber, inlet and outlet ports in said valve chamber, a valve seat provided in said valve chamber between said ports, a valve cooperating with said seat and having a large control piston closely fitted in one end of the valve chamber in the valve body and cooperates therewith to define a control chamber in said one end, said valve also having a small piston closely fitted in an opposite end of the valve chamber, said large piston having a lift area always subject to pressure at the inlet port and having an opposite area providing a hold down area subject to pressure in the control chamber, said small piston having an end area in the opposite end of the valve chamber providing a lift area substantially equal to the difference of the hold down area and the lift area of the large piston, passage means between the control chamber and the opposite end of the valve chamber so that the lift and hold down areas of the valve provide substantially hydrostatic balance of the valve when the pressure in the control chamber is equal to the pressure at the inlet port, spring means acting on said valve to urge said valve against said seat, a pilot valve mounted on said valve body and operable in response to the pressure in said control chamber exceeding a predetermined value to cause said valve to open and limit the pressure at the inlet port to said predetermined value, said control chamber having a minimum axial length to limit the lift of the control piston to a distance sufficient for rated flow through the valve when the pilot valve is open so as to normally have a minimum of fluid in said control chamber to minimize its spring effect on said control piston to thereby minimize valve chatter in the normal operation of said valve although thereby tending to make said valve substantially rigid and less responsive to peaking and fast rising inlet pressures, an accumulator chamber having a volume at least comparable to the volume of the control chamber and constructed and arranged between the ends of the control piston so that fluid under pressure therein produces balanced forces on said control piston, a first flow restricting means comprising N equally restrictive axially extending narrow slots in the periphery of the control piston and connecting said accumulator chamber with said inlet port, a second flow restrictive means comprising more than N equally restrictive axially extending narrow slots in the periphery of the control piston and connecting said accumulator chamber to said control chamber; whereby a fast rising inlet pressure immediately lifts the control piston a small amount and continues to lift the control piston a further small amount at a decelerating rate dependent on said second flow restricting means whose more than N slots permits a greater displacement from the control chamber and an improved spitting capacity for the valve.

4. In a hydrostatically balanced and pilot operated relief valve for a substantially non-compressible fluid, the relief valve comprising a valve body having a valve chamber with inlet and outlet ports, a valve seat in said valve chamber between the ports, a valve cooperating with the seat for closing communication between the ports, the valve including a differential area control piston closely fitted in one end of the valve chamber to define therewith a control chamber and including a piston closely fitted in an opposite end of the valve chamber and having an end area substantially equal to the differential area of the control piston, passage means interconnecting the control chamber and the opposite end of the valve chamber, spring means acting on the valve to urge the valve against the seat, flow restricting means connecting the control chamber to the inlet port, and an improvement comprising:

the construction of the valve body and the valve so the control chamber has a minimum axial length necessary to accommodate maximum opening of the relief valve for rated flow therethrough so as to normally have a minimum of fluid in the control chamber, an accumulator constructed and arranged between the ends of the control piston, and the flow restricting means also connecting the control chamber to the accumulator [and comprising axially extending narrow slots in the periphery of the control piston].

References Cited in the file of this patent or the original patent

UNITED STATES PATENTS

| | | |
|---|---|---|
| 1,571,396 | Darrow | Feb. 2, 1926 |
| 2,609,832 | Smith | Sept. 9, 1952 |
| 2,993,505 | Towler et al. | July 25, 1961 |
| 3,077,898 | Raymond | Feb. 19, 1963 |

FOREIGN PATENTS

| | | |
|---|---|---|
| 499,137 | Belgium | Mar. 1, 1951 |